United States Patent [19]

Hirose et al.

[11] Patent Number: 4,999,895
[45] Date of Patent: Mar. 19, 1991

[54] MACHINE TOOL

[75] Inventors: Akira Hirose, Kounan; Toshiyuki Takei, Nagoya, both of Japan

[73] Assignee: Brother Kogyo Kabushiki Kaisha, Aichi, Japan

[21] Appl. No.: 366,481

[22] Filed: Jun. 15, 1989

[30] Foreign Application Priority Data

Jun. 22, 1988 [JP] Japan ............... 63-82640[U]

[51] Int. Cl.⁵ ............................... B23Q 7/00
[52] U.S. Cl. ...................... 29/33 P; 29/DIG. 56; 409/134; 74/612; 198/346.1; 414/222
[58] Field of Search ....... 29/33 P, DIG. 60, DIG. 59, 29/DIG. 56, 57, 563; 409/134; 51/268, 274; 74/608, 609, 612–616; 414/222; 901/6; 198/346.1

[56] References Cited

U.S. PATENT DOCUMENTS

| | | | |
|---|---|---|---|
| 2,412,904 | 12/1946 | Money et al. .......... | 312/321.5 |
| 2,766,561 | 10/1956 | Carlson .................. | 51/268 |
| 3,602,567 | 8/1971 | Schnell .................. | 312/198 X |
| 3,930,302 | 1/1976 | Ochiai et al. .......... | 29/568 |
| 4,186,978 | 2/1980 | Thomson ............... | 312/321.5 |
| 4,576,537 | 3/1986 | Inaba et al. ............ | 414/222 |
| 4,673,076 | 6/1987 | Mattson ................. | 148/346.1 X |
| 4,677,733 | 7/1987 | Andersson ............. | 29/563 |
| 4,797,989 | 1/1989 | Cherko .................. | 29/563 X |
| 4,809,422 | 3/1989 | Kitamura ............... | 29/563 X |

FOREIGN PATENT DOCUMENTS

| | | |
|---|---|---|
| 204871 | 12/1983 | Fed. Rep. of Germany ........ 51/268 |
| 53-5274 | 2/1978 | Japan . |
| 53-9018 | 3/1978 | Japan . |
| 64-56933 | 4/1989 | Japan . |
| 160847 | 4/1989 | Japan . |
| 1103250 | 4/1989 | Japan . |

*Primary Examiner*—Z. R. Bilinsky
*Assistant Examiner*—Robert Schultz
*Attorney, Agent, or Firm*—Oliff & Berridge

[57] ABSTRACT

A cover unit for covering an external face of a machine tool. The cover unit is formed with small opening for allowing a workpiece to pass therethrough. The cover unit is also formed with a large opening for facilitating maintenance to the machine tool. The small opening is selectively closed by a first closure means to avoid scattering of the cutting chips and machining liquid toward outside during machining to the workpiece. The large opening is selectively closed by a second closure means during machining to the workpiece.

10 Claims, 5 Drawing Sheets

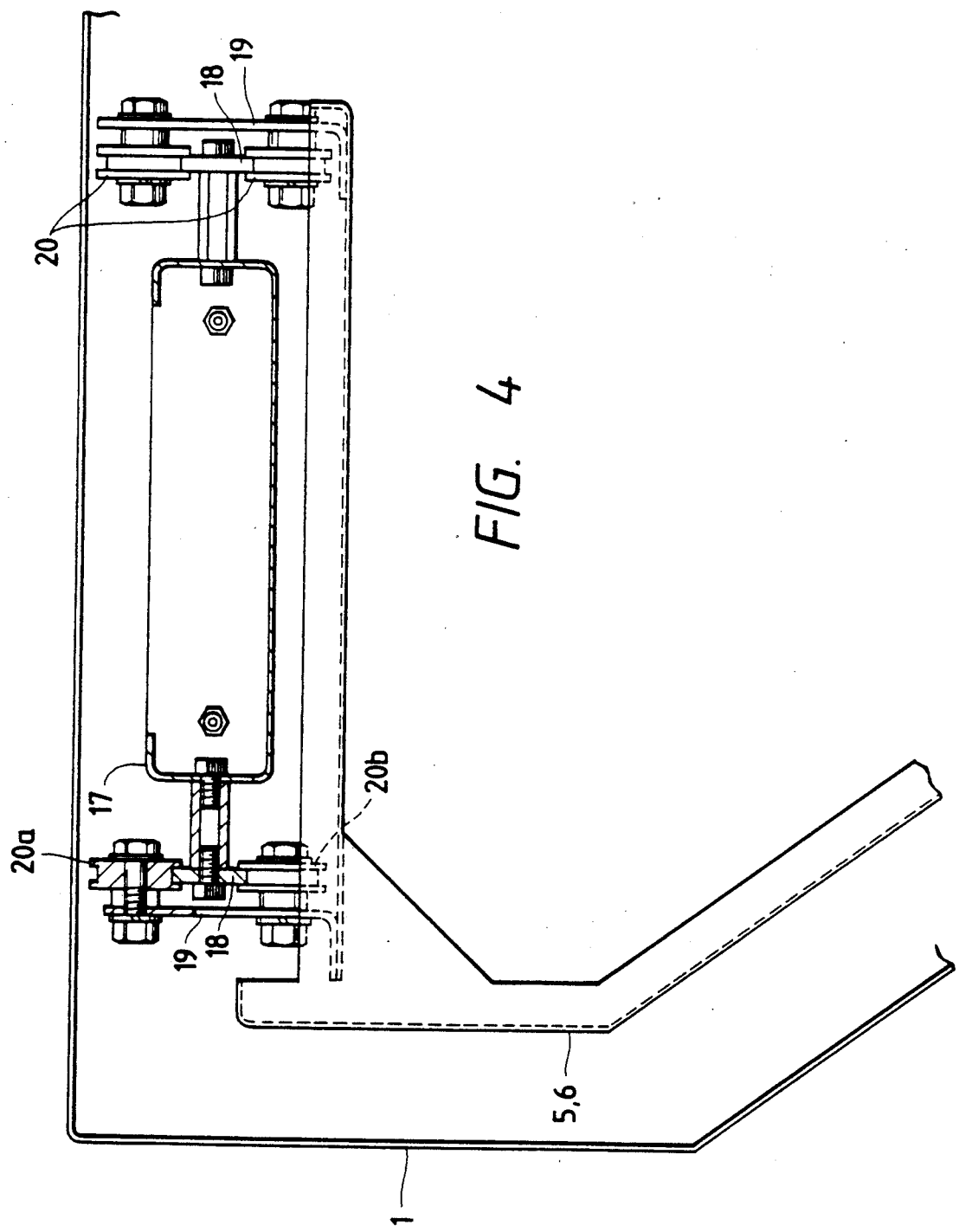

MACHINE TOOL

BACKGROUND OF THE INVENTION

The present invention relates to a machine tool provided with a palette on which a workpiece is detachably mounted, and more particularly, to a cover unit for covering the machine tool to prevent cutting chips and machining liquid from being scattered externally.

In a conventional arrangement, a cover unit is disposed over the machine tool. The cover unit is provided with an opening portion having a predetermined opening region for facilitating maintenance of the machine tool. Further, a workpiece and a palette are moved through the opening portion of the cover unit for undergoing machining to the workpiece in a machining region of the machine tool and for handling the workpiece outside the machining region.

In this instance, the opening area of the cover unit must be sufficiently large for facilitating inspection, handling and maintenance to the machine tool. However, the opening is much greater than outer profiles of the workpiece and the palette, and therefore, a large clearance may result when these items pass through the opening. Accordingly, there is a likelihood that cutting chips generated at the machining region and machining liquid applied to the workpiece may be splashed or scattered from the machining region to the outside through the large clearance.

Particularly, there has been proposed a machining tool providing two machining zones in the machining region, so that while one workpiece is subjected to machining at one machining zone, another workpiece is introduced into another machining zone through the opening. That is, the other workpiece is fixed to a palette at a non machining region outside the cover unit, and the other workpiece and the palette are introduced inside the cover unit through the opening during machining to the one workpiece at the one machining zone. With such arrangement, cutting chips and machining liquid attendant to the first machining zone may be scattered to a significant degree outside through the opening when the second workpiece is moved into the second machining zone through the opening.

SUMMARY OF THE INVENTION

It is therefore, an object of the present invention to overcome the above-described drawbacks and to provide an improved cover unit for a machine tool capable of minimizing scattering or splashing of cutting chips and machining liquid outside the cover unit.

Another object of the invention is to provide a cover unit for a machine tool which provides at least two machining zones inside the cover unit, and the cover unit maximumly preventing the cutting chips and machining liquid from being splashed or scattered through an opening of the cover unit.

These and other objects of the invention will be attained by providing a cover unit for covering an external portion of a machine tool, the machine tool including a spindle having a spindle axis, a spindle head rotatably supporting the spindle, a column movably supporting the spindle head in a direction of the spindle axis relative to a workpiece, a base mount movably supporting the column for at least one direction in a plane perpendicular to the spindle axis, a palette for detachably mounting the workpiece, a table confronting the column for mounting the palette thereon and having a machining region and a workpiece handling region, the palette being movable between the machining region and the handling region, the cover unit comprising: a front panel positioned in front of the machine tool, the front panel being formed with a first open area for allowing the workpiece and the palette to pass therethrough and a second open area having an area larger than that of the first open area and positioned adjacent thereto, a first closure means provided at the front panel for selectively opening the first open area, and a second closure means provided at the front panel for selectively opening the second open area.

In another aspect, in the present invention there is provided a cover unit for covering an external portion of a machine tool, the machine tool providing two machinable areas and having a pair of workpiece passage means juxtaposed with each other for independently moving at least two workpieces into and out of corresponding machinable areas, the cover unit comprising, a front panel positioned in front of the machine tool, the front panel being formed with a first opening at a position in alignment with the pair of workpiece passage means for allowing each one of the workpieces to pass therethrough, the front panel also being formed with a second opening at position immediately above the first opening for facilitating maintenance and handling to the machine tool, the second opening having an area greater than the first opening, a first door unit comprising one door member and another door member positioned side by side in lateral relationship with each other, the one door member selectively closing a half area of the first opening, and the other door member selectively closing the remaining hall area of the first opening, and a second door unit comprising at least one door member for selectively closing the second opening.

During travel of the palette and the workpiece between the machining region and nonmachining region, only the first closure means or the first door unit is opened so as to provide the first open area while closing the second closure means or the second door unit. Therefore, only a minimized open space is provided to thereby restrain scattering of cutting chips and machining oil.

BRIEF DESCRIPTION OF THE DRAWINGS

In the drawings;

FIG. 4 is a cross-sectional view showing a supporting portion for supporting a second or large door in the cover unit according to this invention;

DETAILED DESCRIPTION OF THE PREFERRED EMBODIMENTS

A first embodiment according to this invention will be described with reference to FIGS. 1 thru 7. Throughout the specification, the expressions "front", "rear", "above", "below" and "laterally" are used to define the various parts when the machine tool is disposed in an orientation in which it is intended to be used.

Figure 1:
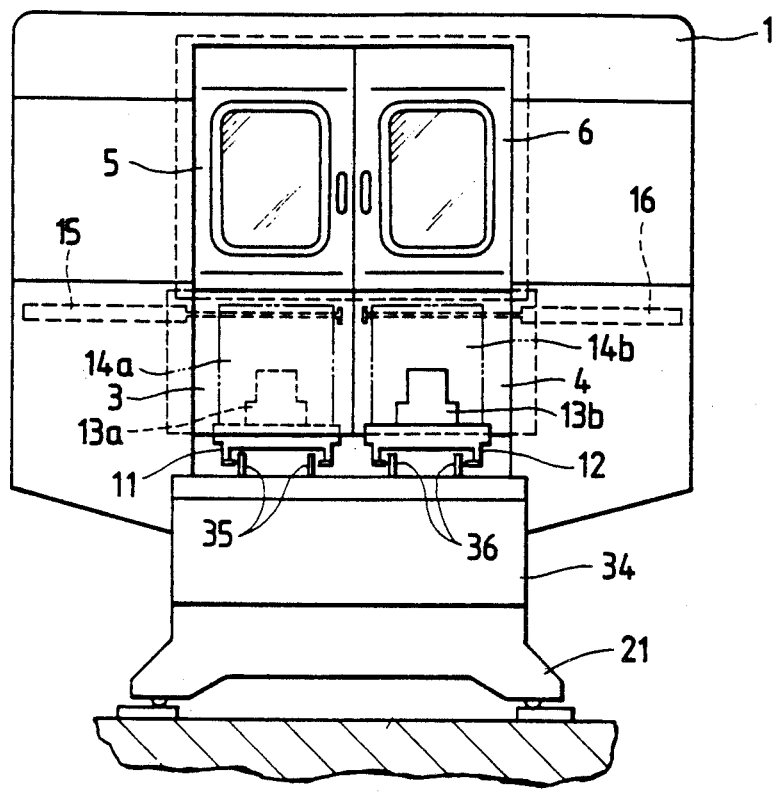
FIG. 1 is a front elevation showing a machine tool and a cover unit according to a first embodiment of this invention.
Figure 2:
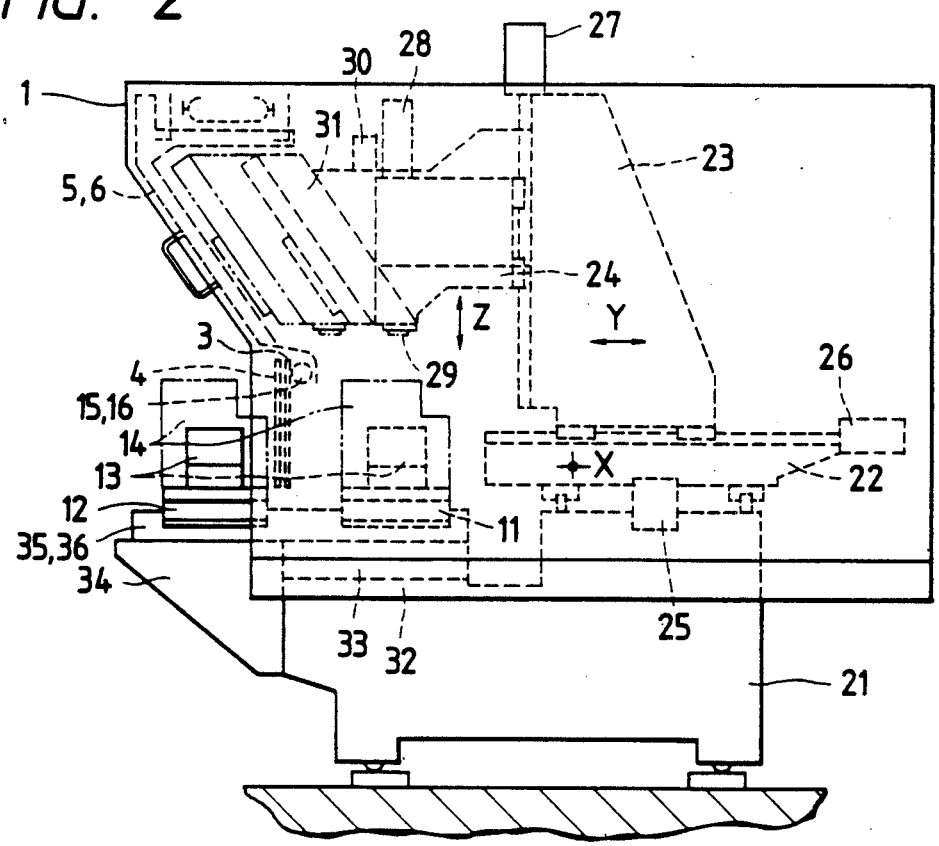
FIG. 2 is a side elevational view showing the machine tool and the cover unit according to the first embodiment of this invention.
Figure 3:
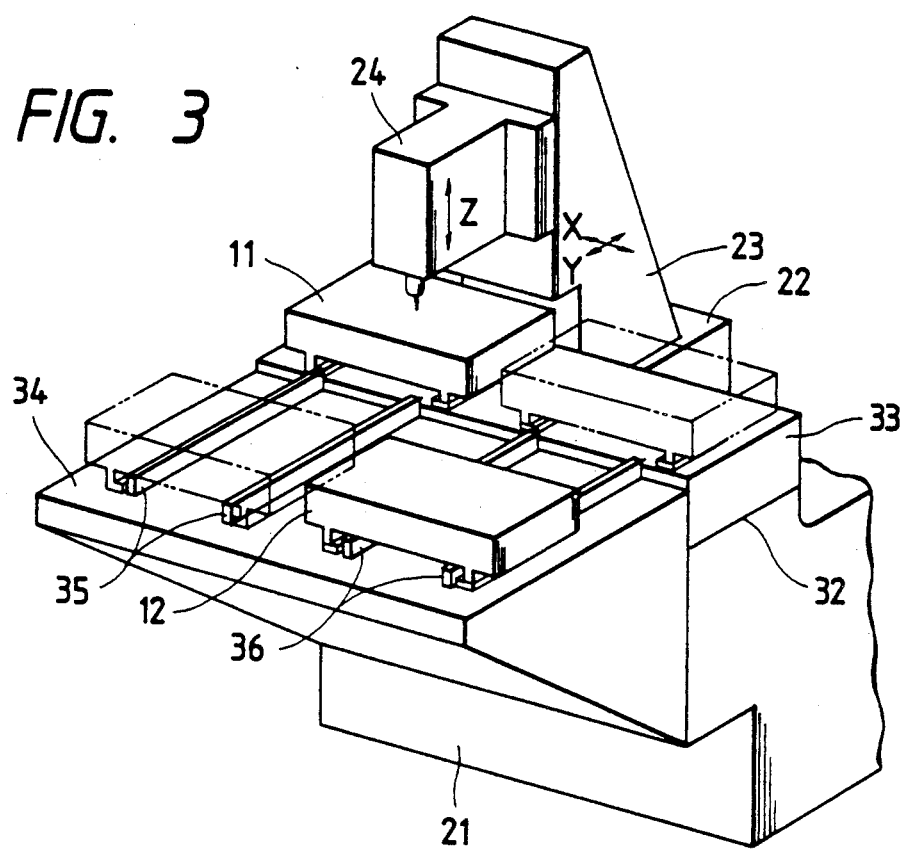
FIG. 3 is a perspective view showing the machine tool.

A machine tool will first be described. The machine tool provides two machining areas, i.e., right and left machining areas on a stationary table 33. More specifically, as shown in FIGS. 1 thru 3, a column base 22 is disposed on a base mount 21, and is slidable with respect thereto in a lateral direction (a first direction or X direction). On the column base 22, a column 23 is disposed slidable in frontward and rearward directions (a second direction or Y direction). Further, on the column 23, a spindle head 24 is disposed slidable in vertical direction (a third or Z direction). The base mount 21 secures a X-axis drive motor 25 drivingly connected to the column base 22 to move the latter, the column base 22 secures a Y-axis drive motor 26 drivingly connected to the column 23, and the column 23 secures a Z-axis drive motor 27 drivingly connected to the spindle head 24. The spindle head 24 is provided with a spindle 29 rotatable about its axis. The spindle head 24 is also provided with a spindle motor 28 connected to the spindle 29 for its rotation. The spindle head 24 further mounts thereon an automatic tool changer (ATC) unit 31 connected to and driven by an ATC motor 30 also mounted on the spindle head 24.

On the table portion, 32 of the base mount 21, the stationary table 33 is fixedly secured on which a pair of palettes and 12 can be mounted in-line in the lateral direction (X direction). The stationary table 33 provides thereon two machining areas, so that given machinable regions 14a, 14b are defined. The spindle 29 is movable above the stationary table 33 and over the two palettes 11, 12 in the lateral direction because of the sliding movement of the column base 22 over the base mount 21, so that the upper surface of the stationary table 83 functions as a machining region.

At the front end surface of the base mount 21, a workpiece handling station 34 is fixedly secured, so that the latter is positioned frontwardly relative to the stationary table 33. The handling station 84 serves as a region outside the machining region (non-machining region) where a free open space is provided without being interfered with by neighboring mechanical components thereby facilitating workpiece replacement operation such that an already machined workpiece is detached from the palette and a new workpiece is assembled thereto. On the handling station 34, provided are two pairs of guide rails 35 and 36 are provided each extending in the second or Y direction and associated with the stationary table 33. The guide rails 35 and 36 serve as workpiece passages juxtaposed with each other. Palettes 11 and 12 are each connected to a hydraulic cylinder (not shown), and are mounted on guide rails 35, 36 respectively. As a result, the palettes 11,12 are movable independent of each other between the stationary table 33 and the handling station 34 (between machining region and non-machining region) by the hydraulic cylinders (not shown).

Clamp means (not shown) are provided at the stationary table 33 and the handling station 34. These clamp means are provided at positions corresponding to the respective palettes 11 and 12 for temporarily fixing the same at positions. More specifically, the palettes 12 are formed with fitting holes (not shown) with which position adjustment pins (not shown) are in fitting engagement so as to define frontward and rearward positions (in Y direction) and lateral positions (in X direction) of the palettes 11, 12 moved toward one of the stationary table 33 and the handling station 34. Thereafter, these palettes 12 undergo clamping for preventing further movements of the palettes.

During machining to one workpiece mounted on one of the palette 11 and placed in machining zone 14a, the other workpiece can be mounted on the other palette 12 positioned outside the machining region and can be moved into the other machinable zone 14b.

The machine tool thus described is covered with a cover unit so as to avoid scattering of cutting chips an machining liquid. The cover unit has a front panel 1, a pair of large doors 5, 6, and a pair of small doors 3, 4. The front panel 1 is formed with small opening and a large opening positioned immediately above the small opening. The large 5,6 and small 3,4 doors are provided at the front panel 1. The small doors 3 and 4 are provided in lateral relationship with each other so as to selectively close a first set of open areas corresponding to the machinable areas 14a, 14b. In other words, one of the small doors 3 is adapted to close half the area of the small opening formed in the front panel 1, and other small door 4 is adapted to close the remaining half area of the small opening. The small door 4 provides a first open zone which allows the workpiece and the palette to pass therethrough. The small doors are formed of a transparent resin plate. It goes without saying that the small opening is formed at a position in alignment with the workpiece passages 35 and 36.

Rails (not shown) are provided at an inner surface of the front panel 1 so as to slidingly support the small doors 3 and 4. The doors 3 and 4 are connected to hydraulic cylinders 15 and 16, respectively for their movements. When these doors 3 and 4 are fully closed, leading end portions of the doors 3 and 4 are overlapped with each other at a substantially central portion of the front panel 1 as best shown in FIG. 1.

The large doors 5 and 6 are also provided in lateral relationship with each other so as to selectively close a second open area or the large opening for maintenance and/or handling of the machine tool. That is, when the doors 5 and 6 are opened, a second open zone is provided for facilitating maintenance and handling of the machine tool. Incidentally, the second open zone is not overlapped with the first open zone.

As shown in FIG. 4, the large doors 5 and 6 are suspendedly supported by a rail 18 extending in lateral direction (X direction) of the machine tool and fixed to a rail holder 17. More specifically, each of the upper portions of the large doors is integrally provided with a bracket 19 which rotatably supports upper and lower rollers 20a and 20b. The upper roller 20a is in rolling contact with the rail 18 for suspending the door 5 or 6, and the lower roller 20b is in rolling contact with the lower face of the rail 18 for guiding travel of the door 5 or 6. With the structure, the door 5 and/or 6 can be manually moved laterally for providing the second open zone.

Next, operation modes of the cover unit will be described in conjunction with the machining modes to the workpieces.

In FIG. 1, the right workpiece 13b is fixed to the right palette 12 when the latter is at the workpiece handling station 34, while the left workpiece 13a positioned at the left machinable zone 14a of the machining region is subjected to machining. In this case both small doors 3 and 4 are closed.

Figure 5:
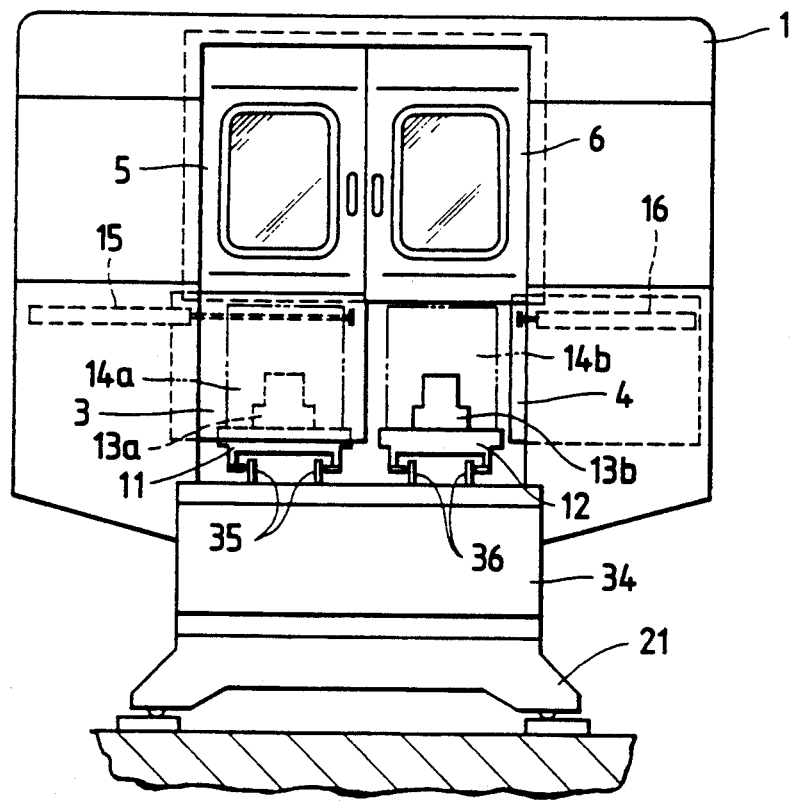
FIGS. 5 thru 7 are front elevational views showing various opening and closing modes of the second door and a first or small door according to the first embodiment of this invention.

In FIG. 5, the right side small door 4 is opened for providing the first open area by actuating the hydraulic cylinder 16, so that workpiece 13b on the right palette 12 can be delivered from the workpiece handling station 34 to the second machinable zone 14b on the stationary table 33 through the first open area. In this case, the left side small door 3 and large doors 4 and 5 are closed. As a result, the first open area is only within a limited range which only allows the right workpiece 13b and the right palette 12 to pass therethrough. Accordingly, only a limited amount of scattering of cutting chips generated by machining to the left workpiece 13a and machining liquid applied thereto can occur.

Figure 6:
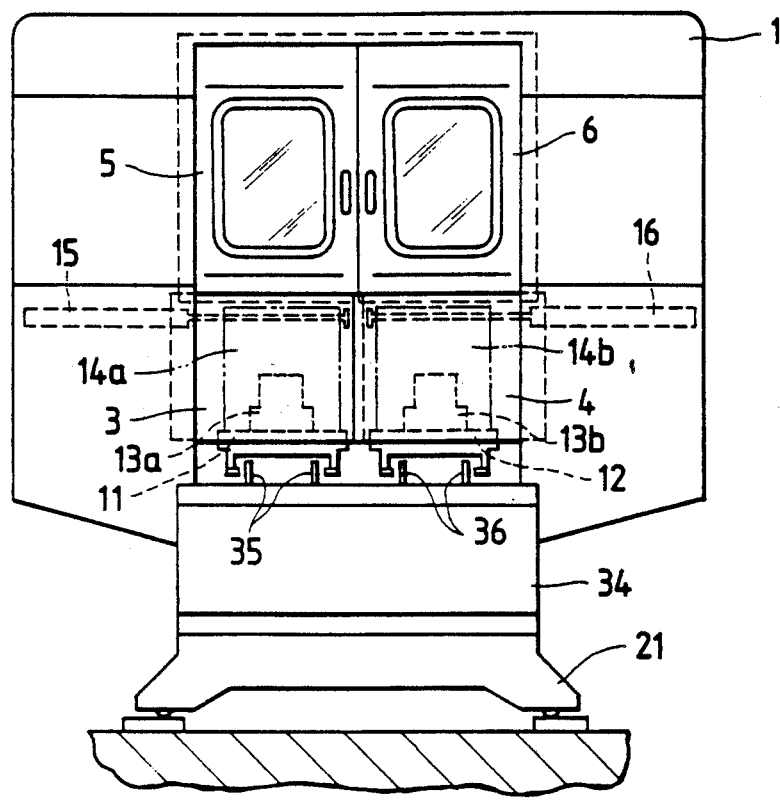

In FIG. 6, the right palette 12 is fixedly clamped at the stationary table 33, and right small door 4 is closed by the cylinder 16, when the machining of the left workpiece 13a is completed, the right workpiece is then subjected to machining after lateral movement of the column base 22. At the same time the left small door 3 is opened to allow the finished workpiece 13a and the left palette 11 to be moved from the stationary table 33 to the handling station 34 through the another first open space. Then the left small door 3 is again closed.

As described above, when moving one of the right and left palettes 11 and 12 between the stationary table 33 and the handling station 34, a corresponding one of the right and left small doors 3 and 4 is opened.

Figure 7:
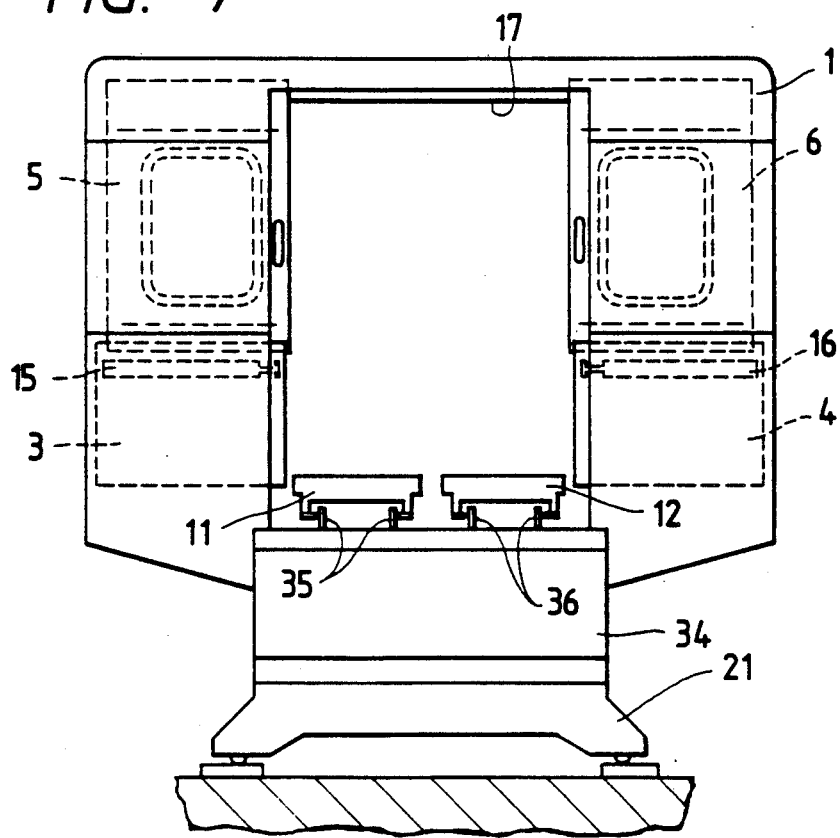

In FIG. 7, both right and left large doors 5 and 6 are opened for providing the second open area for cleaning or maintenance to the machine tool. Since the second open area is significantly larger than the first open area, such cleaning and maintenance works can be conducted easily.

In the first embodiment described above, two different pairs of doors are provided for independent opening and closing operations, and each of the doors has relatively small weight. Therefore, high rigidity to each of the doors is not required. Further, the pair of small doors and the pair of large doors are supported to the front panel at positions different from each other. Therefore, any load applied to the front panel can be decentralized to thereby avoid stress concentration at the specific portion of the front panel. Accordingly, high rigidity with respect to the panel is also not required for supporting the doors, to thereby minimizing overall weight of the panel.

Figure 8:
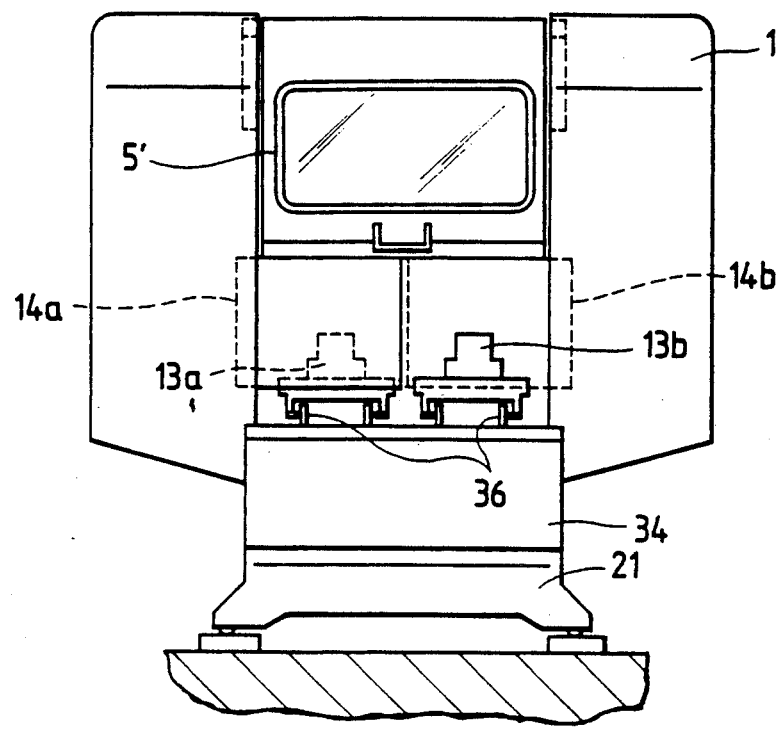
FIG. 8 is a front elevation showing a machine tool and a cover unit according to a second embodiment of this invention.
Figure 9:
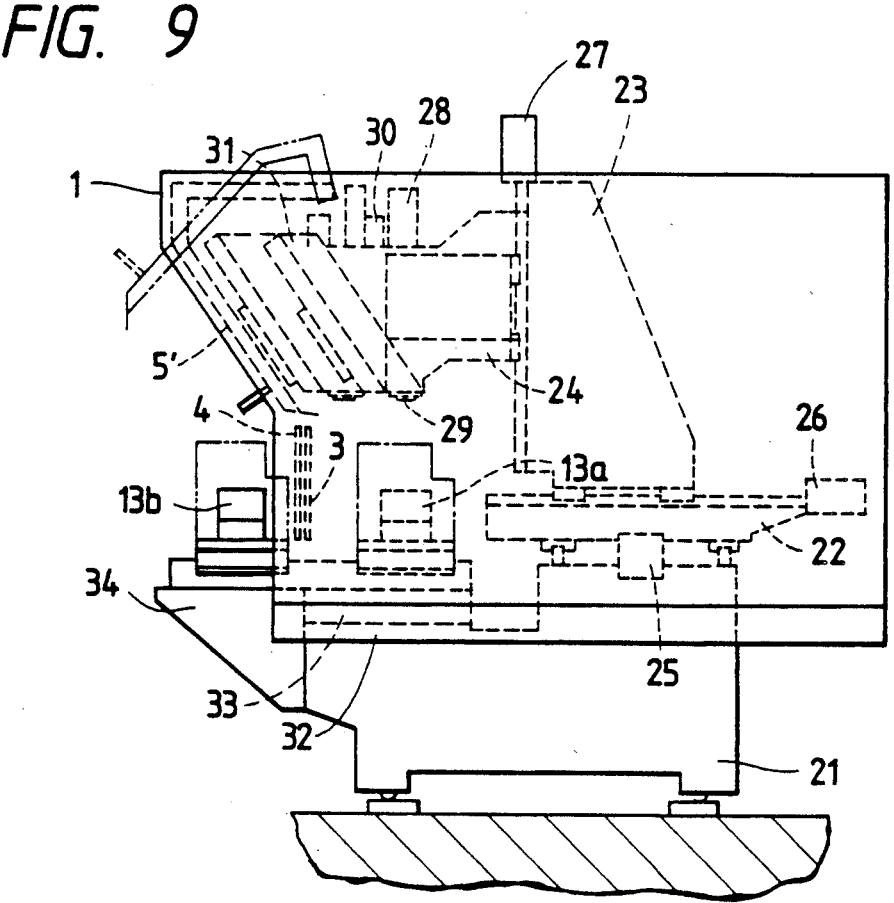
FIG. 9 is a side elevational view showing the machine tool and the cover unit according to the second embodiment of this invention.

A second embodiment of this invention is shown in FIGS. 8 and 9, wherein like parts and components are designated by the same reference numerals and characters as those shown in the first embodiment. In the first embodiment, two large doors 5 and 6 are provided and they are slidable in lateral direction of the machine tool. On the other hand, in the second embodiment, as shown, a single large door 5' is provided and has an upper end portion pivotally supported to the front panel 1 so as to provide the second open area upon pivotal motion of the door 5' for facilitating the maintenance.

With this structure, the numbers of the components or segments can be reduced yet performing function equivalent to the large doors 5 and 6 of the first embodiment.

The present invention is not limited to the above described embodiments, but various changes and modifications can be made.

In view of the foregoing, according to the cover unit of this invention, at least two opening areas can be provided by opening different kinds of doors. The first opening area has relatively small area so as to allow the workpiece to pass therethrough, and the second opening area has relatively large open area for facilitating maintenance to the machine tool. When the workpiece is moved between the machining region and the nonmachining region, only the first opening area is utilized while closing the door corresponding to the second open area. As a result, the scattering of the cutting chips and machining liquid toward outside of the cover unit is restrained.

What is claimed is:

1. In combination with a machine tool, wherein the machine tool comprises a spindle having a spindle axis, a spindle head rotatably supporting the spindle, a column movably supporting the spindle head in a direction of the spindle axis relative to a workpiece, a base mount movably supporting the column for at least one direction in a plane perpendicular to the spindle axis, a palette for detachably mounting the workpiece, a table confronting the column for mounting the palette thereon and having a machining region and a workpiece handling region, the palette being movable between the machining region and the handling region, an improved cover unit which comprises;
    a front panel positioned in front of the machine tool, the front panel being formed with a first open area for allowing the workpiece and the palette to pass therethrough and a second open area having an area larger than that of the first open area and positioned adjacent thereto;
    a first closure means provided at the front panel for selectively opening the first open area; and
    a second closure means provided at the front panel for selectively opening the second open area.

2. The improved cover unit as claimed in claim 1, wherein the first closure means comprises a first pair of doors arranged laterally with each other and movable independent of each other, and wherein the second closure means comprises a second pair of doors arranged laterally with each other and movable independent of each other.

3. The improved cover unit as claimed in claim 1, wherein the second open area is positioned above the first open area and continuous therewith.

4. The improved unit as claimed in claim 2, wherein the second open area is positioned above the first open area and contiguous therewith.

5. The improved cover unit as claimed in claim 2, wherein the first closure means for the first pair of doors further comprises means for laterally sliding each door of said first pair of doors and the second closure means for the second pair of doors further comprises means for laterally sliding each door of said second pair of doors with respect to the front panel.

6. The improved cover unit as claimed in claim 1, wherein the second closure means comprises a single door having an upper end pivotally supported to the front panel.

7. The improvement unit as claimed in claim 6, wherein the first closure means comprises a pair of doors slidably disposed below the single pivotal door.

8. In combination with a machine tool wherein the machine tool comprises at least one machinable area and at least one workpiece passage means for moving workpieces into and out of corresponding machinable areas, an improved cover unit which comprises:
   a front panel positioned in front of the machine tool, the front panel being formed with a first opening at a position in alignment with said workpiece passage means for allowing said workpieces to pass therethrough, the front panel also being formed with a second opening at position immediately above the first opening for facilitating maintenance and handling to the machine tool, the second opening having an area greater than the first opening;
   a first door unit comprising one door member and another door member positioned side by side in lateral relationship with each other, the one door member selectively closing a half area of the first opening, and the other door member selectively closing a remaining half area of the first opening; and
   a second door unit comprising at least one door member for selectively closing the second opening.

9. The improved cover unit as claimed in claim 8, wherein the second door unit comprises a first door member and a second door member positioned side by side in lateral relationship with each other, the first door member selectively closing a half area of the second opening, and the second door member selectively closing remaining half area of the second opening.

10. A machine tool comprising;
   two machinable areas;
   a pair of workpiece passage means juxtaposed with each other for independently moving at least two workpieces into and out of corresponding machinable areas;
   a front panel positioned in front of the machine tool, the front panel being formed with a first opening at a position in alignment with the pair of workpiece passage means for allowing each one of the workpiece to pass therethrough, the front panel also being formed with a second opening at a position immediately above the first opening for facilitating maintenance and handling to the machine tool, the second opening having an area greater than the first opening;
   a first door unit comprising one door member and another door member positioned side by side in lateral relationship with each other, the one door member selectively closing a half area of the first opening, and the other door member selectively closing remaining half area of the first opening; and
   a second door unit comprising at least one door member for selectively closing the second opening.

* * * * *